United States Patent [19]

Whitehead

[11] 4,294,937
[45] Oct. 13, 1981

[54] IMPACT POLYMERS

[75] Inventor: Richard O. Whitehead, Houston, Tex.

[73] Assignee: Shell Oil Company, Houston, Tex.

[21] Appl. No.: 49,840

[22] Filed: Jun. 18, 1979

[51] Int. Cl.$^3$ .......................... C08L 9/06; C08L 53/02
[52] U.S. Cl. ........................................ 525/99; 525/98
[58] Field of Search ........................................... 525/99

[56] References Cited

U.S. PATENT DOCUMENTS

| | | | |
|---|---|---|---|
| 3,485,894 | 12/1969 | Porter | 525/193 |
| 3,868,434 | 2/1975 | Westphal et al. | 525/304 |
| 3,929,936 | 12/1975 | Davies et al. | 525/316 |
| 3,976,721 | 8/1976 | Satake et al. | 525/243 |
| 4,026,969 | 5/1977 | Mostert et al. | 525/192 |
| 4,096,205 | 6/1978 | Reith | 525/314 |

*Primary Examiner*—John C. Bleutge
*Assistant Examiner*—A. H. Koeckert
*Attorney, Agent, or Firm*—Dean F. Vance

[57] ABSTRACT

Vinyl aromatic compositions having improved impact and toughness are disclosed comprising interpolymers containing a mixture of a polybutadiene rubber with a specific styrene-butadiene two-block copolymer and a poly(monovinylaromatic) compound.

6 Claims, No Drawings

IMPACT POLYMERS

BACKGROUND OF THE INVENTION

It has long been known that the brittle nature of poly (monovinylaromatic) polymers such as polystyrene is overcome by incorporating a minor amount of rubber. The rubber is largely incompatible with the polymeric vinyl compounds resulting in a two-phase system comprising a dispersed rubbery phase and a poly (monovinyl-aromatic) matrix.

One of the major variables in the preparation of such impact improved polymers is the selection of the particular rubber to be employed. Among the various rubbers mentioned in the patent literature are:
   medium cis polybutadiene: U.S. Pat. No. 3,868,434
   styrene-butadiene-block copolymers: U.S. Pat. No. 3,485,894
   styrene-butadiene random copolymers: U.S. Pat. No. 3,976,721
   lithium-initiated styrene-butadiene copolymers: U.S. Pat. No. 3,929,936
   low styrene content styrene-butadiene copolymers: U.S. Pat. No. 4,096,205
   Blends of polybutadiene rubber and polyisoprene rubber: U.S. Pat. No. 4,026,969
Numerous other patents claiming advantages for certain rubbers or blends of rubbers are also known.

A novel rubber composition for use in making impact improved polymers has now been found. This rubber composition not only results in improved impact properties, it does so at lower gel and lower rubber usage.

SUMMARY OF THE INVENTION

There are two aspects to the present invention. One aspect deals with an improved impact polymer and the other aspect deals with the process to make the polymer. As for the first aspect, the invention contemplates a graft copolymer composition having improved toughness, said composition consisting essentially of:
   (a) from about 4 to about 12 parts by weight of mixture of a polybutadiene elastomer and a styrene-butadiene two-block copolymer in a weight ratio of styrene-butadiene two-block copolymer to polybutadiene elastomer of about 1:80 to about 6:80, where the average molecular weight of the styrene block of the block copolymer is between about 45,000 and about 150,000, and the average molecular weight of the butadiene block of the block polymer is between about 25,000 and about 100,000; and
   (b) from about 96 to about 88 parts by weight of a polymerized styrene.

The invention also contemplates an improved process for preparing an impact modified poly(vinyl aromatic) composition comprising bulk thermal polymerizing of from about 2 to about 25 parts of rubber dissolved in about 98 to about 75 parts of a feed in which the sole polymerizable monomer component consists essentially of one or more monovinyl aromatic compounds at a temperature in the range from about 90° C. to about 200° C., with agitation until the reaction mixture has undergone phase inversion, for a time sufficient to polymerize substantially all of the monovinyl aromatic compound and removing residual monomers to form an interpolymer containing discrete gelled rubber particles, which improvement comprises using as the rubber a mixture of polybutadiene elastomer and a styrene-butadiene two-block copolymer in a weight ratio of styrene-butadiene two-block copolymer to polybutadiene elastomer of about 1:80 to about 6:80, where the average molecular weight of the styrene block of the block copolymer is between about 45,000 and about 150,000 and the average molecular weight of the butadiene block of the block copolymer is between about 25,000 and 100,000.

As shown in the following Illustrative Embodiments, polymers according to the present invention have improved impact and toughness even at lower gel and rubber contents. Still further, the polymers according to the present invention have improved tensile strength and stiffness.

DETAILED DESCRIPTION OF THE INVENTION

The monovinyl aromatic compounds which can be employed in producing the rubber modified polymers according to the invention include monovinyl aromatic compounds having the vinyl radical i.e., the ethylenically unsaturated radical, attached directly to a carbon atom of the aromatic nucleus. Styrene is the preferred monovinyl aromatic compound. Examples of other compounds applicable herein are the alkyl and dialkyl derivatives of styrene such as the dimethylstyrenes, ethylstyrenes, isopropylstyrenes, butyl-styrenes, etc.; the halogen derivatives of styrene, for example, chloro- and dichlorostyrene and the mono- and dibromostyrenes and alkylhalostyrenes as well as mixtures of these compounds with styrene or with each other. Alphamethylstyrene may be substituted in a minor amount, for example 2 to 30% by weight, preferably from about 5 to 25% in the total composition for a portion of the monovinylaromatic monomer to improve properties of the interpolymers such as heat distortion temperature.

Broadly, the polymerized vinyl aromatic component comprises from about 75 to about 98% by weight of the final composition; in a more preferred aspect it comprises from about 88 to 96%.

The unvulcanized synthetic rubber materials used in preparing the interpolymer compositions according to the invention are polybutadiene (BR) and certain styrene-butadiene two-block copolymers.

The butadiene homopolymers employed to prepare the interpolymers preferably have a cis-1,4 content from about 30 to 99% by weight and more preferably from about 35 to about 96%. Polybutadienes having a 1,2 content less than about 15% are preferred; those having a 1,2 content less than about 12% are particularly preferred. The cis-1,4 content of the polybutadiene are conveniently determined by infrared technique on solution of the elastomer in carbon disulfide, e.g., according to the procedure of Silas et al., Analytical Chemistry, Volume 31, page 529 (1959).

Conventional linear rubbery polybutadiene homopolymer may be employed to prepare the compositions, however, nonlinear polymers prepared, for example, according to U.S. Pat. No. 3,551,392 to Snyder et al are also contemplated. These rubbery materials will have a molecular weight of at least about 20,000. Preferred are rubbers having an intrinsic viscosity in the range between about 1.9 to 8.0, and most preferably 2.0 to 3.6 dl/g in toluene at 30° C. Rubbers having a Mooney viscosity, ML-4,212° F., in the range between about 30 and 70, particularly between 35 and 60, are especially suitable.

The block copolymer employed herein is a styrene-butadiene two-block copolymer having a weight average molecular weight distribution of about 45,000 to about 150,000 for the styrene block and about 25,000 to about 100,000 for the butadiene block. Preferred molecular weight ranges are about 100,000 to about 150,000 for the styrene block and about 30,000 to about 50,000 for the butadiene block. The molecular weight limits for the styrene block are particularly important because the improved toughness of these compositions probably occurs from improved interfacial adhesion between the dispersed phase particles and the matrix polystyrene. The improved adhesion would be a consequence of entanglement of the block polystyrene chains with the molecules of the matrix polystyrene.

The styrene-butadiene two-block copolymer is produced by known methods, i.e., by lithium initiation. Suitable methods of preparation are disclosed in U.S. Pat. No. 3,485,894 and 3,929,936 cited in the Background of the Invention.

Another critical aspect of the invention involves the relative amounts of butadiene homopolymer and styrenebutadiene block copolymer employed. The range of weight ratios of styrene-butadiene block copolymer to polybutadiene elastomer is about 1:80 to about 6:80; preferrably about 2:80 to about 4:80. Expressed another way, when the amount of polybutadiene elastomer employed is 8% by weight, the range for the styrenebutadiene block copolymer is 0.1% to 0.6%, preferably 0.2% to 0.4%. It is particularly surprising that such a small amount of styrene-butadiene block copolymer when added to a standard HIPS formula will result in such a significant improvement in impact.

The interpolymers according to the invention are prepared by mixing the polybutadiene elastomer and styrene-butadiene block copolymer with the vinyl aromatic monomer in the desired proportions and initiating the polymerization. Best results are obtained when the elastomers are dissolved with monomer prior to polymerization in a bulk polymerization process.

Antioxidants, chain regulators, lubricants, and fillers inert to the reaction can also be added. Examples of suitable antioxidants include 2,6-di-tert-butyl-4-methylphenol and trisnonylphenylphosphite, which may be added in amounts from about 0.1% to about 2% by weight of the total reaction mixture and preferably in amounts from about 0.25 to 1%. Light stabilizers such as 2-alkyl-2,3,4-benzotriazole may also be incorporated into the polymerization mass. Suitable chain transfer agents include sulfhydryl compounds, e.g., dodecylmercaptan and 2-mercaptoethanol. Preferred are alkyl mercaptans having from about 8 to 20 carbon atoms per molecule or mixtures of these which can be added to the reaction mixture in amounts from about 0.0005 up to about 1% weight. The preferred concentration of mercaptan is from about 0.015 to about 0.05 weight percent. The polymerization may be carried out in the presence of small amounts of other compounds which are known to be useful in preparing molding compositions. This includes low concentrations of lubricants or flow agents such as mineral oil of a viscosity in the range of about 100 to 500 SSU, paraffin wax, petrolatum, polybutenes and the like in concentrations up to about 10% by weight of the total mixture, preferably in amounts of about 1 to about 5 weight percent, for improving both the processing and molding characteristics of the polymer product.

While the polymerization is generally carried out in the absence of a catalyst, it may sometimes be desirable to add a catalyst of the free radical generating type. Suitable polymerization catalysts of this type are peroxides such as benzoyl peroxide, di-tert-butyl-peroxide, t-butyl peroxypivalate, diethyl-peroxy-carbonate, t-butyl peracetate and others well known in the art which are generally added in concentrations from about 0.01 to 0.2% by weight of the polymerized monomers. Coloring agents which are inert to the polymerization may also be added.

The mixture is then subjected to conditions which will cause the vinyl aromatic compound to polymerize with the mixed rubbers in a bulk process. Good results are obtained by heating the solution to a temperature of from about 90° C. to about 200° C. for a time sufficient to polymerize substantially all of the vinyl aromatic compound. The heating may be done with the addition of catalysts; the use of catalysts allows somewhat lower polymerization temperatures. Generally speaking, bulk polymerization for high impact compositions requires agitation for temperature control of the first polymerization stage and for proper dispersal of the rubbery material as it undergoes phase inversion, i.e., precipitates from the solution during this early polymerization step.

After the polymerization is complete the product may contain a small amount, e.g., about 1 to 2% of unpolymerized monovinyl aromatic compound. As the presence of monomer has an adverse affect on impact properties, this is preferably removed by any of the known methods for removing residual monomer. Such methods include, e.g., subjecting the interpolymer to vacuum, e.g., in a devolatilizing extruder.

The invention is further illustrated by refrence to the following Illustrative Embodiments, which are given for the purpose of illustration only and are not meant to limit the invention to the particular reactants and conditions employed therein.

Illustrative Embodiment I

Eight parts by weight of a medium cis-content polybutadiene homopolymer (designated "Diene 55") was dissolved in 92 parts by weight of styrene monomer and batch polymerized with stirring by heating to 125° C. until about 30% of the styrene was converted to polystyrene. This prepolymerizate was then converted to high impact polystyrene by heating it for 8–9 hours in a jar equipped with a reflux condenser in a sand bath. The sand bath temperature was programmed to increase at the rate of 10° C. per hour and to cut off and begin cooling at 200° C. Similar polymerizations but with 0.2%w of various two-block, styrene-butadiene polymers were also carried out. All of the polymers were devolatilized by heating at 170°–180° C. on a two roll mill for 10 minutes. The materials were then ground into small pieces, compression molded, and cut or machined into specimens for various impact and toughness tests. The properties of the various block copolymers are shown in Table 1 and the results of the toughness tests in Tables 2 and 2a. The block polymer labelled TR60-2836 clearly gives rise to highest unnotched Izod and Gardner DIF (a falling dart test).

TABLE 1
PROPERTIES OF S-B BLOCK COPOLYMERS

| Block Polymer | Bound Styrene, % | Molecular Weight × 10⁻³ | | |
|---|---|---|---|---|
| | | Styrene | Butadiene | Total |
| TR60-2832 | 19.6 | 48 | 197 | 245 |
| TR60-2833 | 32.4 | 48 | 100 | 148 |
| TR60-2835 | 90.9 | 50 | 5 | 55 |
| TR60-2836 | 80.9 | 120 | 30 | 150 |
| TR60-2851 | 8.8 | 9.4 | 97 | 106.4 |

TABLE 2
PROPERTIES OF IMPACT POLYSTYRENE INCORPORATING MINOR AMOUNTS OF BLOCK COPOLYMERS

| Run Number | Block Polymer | Izod, ft-lb/in | | Gardner DIF, ft-lb/in | Toughness Index |
|---|---|---|---|---|---|
| | | Notched | Unnotched | | |
| 1 | Control (1) | 1.38 | 13.9 | 33 | 13.6 |
| 2 | Control (2) | 1.51 | 15.2 | 37 | 15.0 |
| 3 | TR60-2832 | 1.53 | 16.3 | 45 | 16.5 |
| 4 | TR60-2833 | 1.50 | 17.0 | 50 | 17.3 |
| 5 | TR60-2835 | 1.52 | 17.8, 19.2 | 38 | 16.1/ 16.5 |
| 6 | TR60-2836 | 1.56 | 19.2 | 67 | 20.5 |
| 7 | TR60-2851 | 1.44 | 14.3 | 59 | 17.4 |

TABLE 2a

| Run Number | Gel, % | Swell Index | Diene Rubber, % |
|---|---|---|---|
| 1 | 34.2 | 10.1 | 8.1 |
| 3 | 32.9 | 9.6 | 8.5 |
| 4 | 33.5 | 9.9 | 8.1 |
| 5 | 33.0 | 9.7 | 8.4 |
| 6 | 33.2 | 10.2 | 8.1 |
| 7 | 34.5 | 9.7 | 8.4 |

Sometimes one measure of toughness is better than another. The standard tests employed are notched Izod, unnotched Izod, and the Gardner DIF, a falling dart technique. In order to obtain a single measure of toughness for correlation, the results of these three tests were combined into a "Toughness Index", calculated as follows:

$$T = [10 \times \text{Izod(notched)} + \text{Izod(unnotched)} + \text{Gardner DIF}/3]/3$$

As shown in Table 2, the impact polymer according to the invention (Run 6) had the highest toughness index value.

Illustrative Embodiment II

Polymerizations similar to those carried out in Illustrative Embodiment I were performed and the products recovered and tested. In these polymerizations the recipe contained various concentrations of the two-block polymer designated TR60-2836 which had a polystyrene block length of 120,000 and a polybutadiene block length of 30,000. The toughness of the products at various concentration of block polymer is illustrated in Table 3. Maximum product toughness was achieved in range of 0.2 to 0.4%w. One skilled in the art would not expect such noticeable improvements in toughness with such minor amounts of block copolymer.

TABLE 3
EFFECT OF CONCENTRATION OF BEST TWO-BLOCK POLYMER IN PRODUCT TOUGHNESS

| Run Number | Block Polymer Concentration, % | Izod ft-lb/in | | Gardner DIF, ft-lb/in | Toughness Index |
|---|---|---|---|---|---|
| | | Notched | Unnotched | | |
| 8 | Control (1) | 1.38 | 13.9 | 33 | 13.6 |
| 9 | Control (2) | 1.51 | 15.2 | 37 | 15.0 |
| 10 | 0.1 | 1.52 | 16.0 | 45 | 16.4 |
| 11 | 0.2 | 1.49 | 18.9, 19.2 | 54, 67 | 18.5/ 20.3 |
| 12 | 0.4 | 1.44 | 19.5 | 60 | 19.3 |
| 13 | 0.6 | 1.53 | 17.7 | 51 | 17.8 |

Illustrative Embodiment III

Polymerizations were carried out in a polystyrene development unit to establish the validity of the results from small scale batch polymerizations. The polymerization recipe consisted of 6.0% polybutadiene (Diene 55) and 94.0% of styrene monomer. It also contained ethylbenzene diluent (10parts per hundred of styrene plus rubber) and 70 ppm of t-dodecylmercaptan as chain regulator. One percent of white mineral oil was added as a viscosity modifier. The block polymer TR60-2836 was added in one run at (0.2%) and for comparison the triblock KRATON ® 1101 at 0.3% was also evaluated.

The polymerization system consisted of a first stage backmixed reactor 10% conversion followed by a sequence of reactors in which plug flow was approximated by a system of alternate coils and rotating spokes and progressively increasing conversion. Following vacuum devolatilization the materials were subjected to a wide variety of tests on molded, extruded and thermoformed parts. The results are shown in Table 4.

The material containing two-block polymer TR60-2836 is clearly superior in every test of toughness except notched Izod where it is equivalent, and the squeeze test of thermoformed cups where it is equivalent.

TABLE 4
BLOCK POLYMERS IN HIGH IMPACT POLYSTYRENE PRODUCTS FROM DEVELOPMENT UNIT

| Properties | Run Number | | |
|---|---|---|---|
| | 44B | 45 | 47 |
| Rubber, % w Diene 55 | 6.4 | 6.0 | 6.0 |
| Rubber, Other | — | KRATON ® 1101 | TR60-2836 |
| Rubber, Other, % w | — | 0.3 | 0.2 |
| Melt index | 3.4 | 2.7 | 2.6 |
| Gel, % | 22.3 | 21.7 | 20.4 |
| Swell Index | 11.7 | 11.0 | 9.8 |
| Particle Size, $V_{av}/N_{av}$, μ | 5.2/1.2 | 4.6/1.5 | 4.1/1.1 |
| $M_w/M_n$ | 212/84 | 228/84 | 215/96 |
| Residual Volatiles, % S/EB | 0.06/.06 | 0.05/.05 | 0.04/.04 |
| Vicat, °F. | 211 | 211 | 212 |
| Izod, ft lb/in, IM/CM | 1.34/1.33 | 1.40/1.40 | 1.39/1.37 |

TABLE 4-continued
BLOCK POLYMERS IN HIGH IMPACT POLYSTYRENE PRODUCTS FROM DEVELOPMENT UNIT

| Properties | Run Number | | |
|---|---|---|---|
| | 44B | 45 | 47 |
| IM Tensile Yld./Ult., psi | 3060/3640 | 3200/3760 | 3370/3950 |
| Im Elongation, % | 48 | 46 | 48 |
| Flexural Strength, psi | 6250 | 6680 | 6850 |
| Flexural Modulus, psi X$10^5$ | 2.87 | 2.94 | 3.04 |
| 30-mil sheet DIF, ft lb/in, | | | |
| Shell | 390 | 325 | 520 |
| Gardner | 69 | 72 | 94 |
| Sheet Tensile (Ult.), MD/TD, psi | 2960/2790 | 2920/2790 | 3150/3060 |
| Sheet Elongation (Ult.), MD/TD, % | 54/47 | 44/39 | 45/43 |
| Sheet Gloss, 60° top/btm | 9/16 | 9/14 | 9/17 |
| Thermoform Toughness, | | | |
| Squeeze test | 6 | 8 | 7 |
| Bottle drop, % failures | 8 | 8 | 0 |
| Sidewall DIF ft lb/in | 51 | 58 | 77 |

What is claimed is:

1. A graft copolymer composition having improved toughness consisting essentially of:
   (a) from about 4 to about 12 parts by weight of a mixture of a polybutadiene elastomer and a styrene-butadiene two-block copolymer in a weight ratio of styrene-butadiene two-block copolymer to polybutadiene elastomer of about 2:80 to about 4:80, where the average molecular weight of the styrene block of the block copolymer is between about 100,000 and about 150,000, and the average molecular weight of the butadiene block of the block copolymer is between about 30,000 and about 60,000; and
   (b) from about 96 to about 88 parts by weight of a polymerized styrene.

2. A composition according to claim 1 wherein said polybutadiene elastomer has a cis-1,4 content of about 30 to about 99% by weight and a vinyl-1,2 content of less than about 15% by weight.

3. A composition according to claim 2 wherein said polybutadiene elastomer has a Mooney viscosity of between about 30 and 70.

4. In the process for preparing an impact modified poly(vinyl aromatic) composition comprising bulk thermal polymerizing of from about 2 to about 25 parts of rubber dissolved in about 98 to about 75 parts of a feed in which the sold polymerizable monomer component consists essentially of one or more monovinyl aromatic compounds at a temperature in the range from about 90° C. to about 200° C., with agitation until the reaction mixture has undergone phase inversion, for a time sufficient to polymerize substantially all of the monovinyl aromatic compound and removing residual monomers to form an interpolymer containing discrete gelled rubber particles, the improvement which comprises using as the rubber a mixture of polybutadiene elastomer and a styrene-butadiene two-block copolymer in a weight ratio of styrene-butadiene two block copolymer to polybutadiene elastomer of about 2:80 to about 4:80, where the average molecular weight of the styrene block of the block copolymer is between about 100,000 and about 150,000, and the average molecular weight of the butadiene block of the block copolymer is between about 30,000 and about 60,000.

5. A process according to claim 4 wherein said monovinyl aromatic compound is styrene.

6. A process according to claim 2 wherein said polybutadiene elastomer has a cis-1,4 content of about 30 to about 99% by weight and a vinyl-1,2 content of less than about 15% by weight.

* * * * *